United States Patent
Labate et al.

(10) Patent No.: US 7,260,734 B2
(45) Date of Patent: Aug. 21, 2007

(54) METHOD AND CIRCUIT FOR TRANSMITTING DATA BETWEEN SYSTEMS HAVING DIFFERENT CLOCK SPEEDS

(75) Inventors: Francesco Labate, Villach (AT); Michael Staber, Villach (AT)

(73) Assignee: Infineon Technologies AG, Munich (DE)

( * ) Notice: Subject to any disclaimer, the term of this patent is extended or adjusted under 35 U.S.C. 154(b) by 441 days.

(21) Appl. No.: 10/480,736

(22) PCT Filed: Jun. 4, 2002

(86) PCT No.: PCT/EP02/06104

§ 371 (c)(1), (2), (4) Date: May 26, 2004

(87) PCT Pub. No.: WO02/101938

PCT Pub. Date: Dec. 19, 2002

(65) Prior Publication Data

US 2004/0249981 A1 Dec. 9, 2004

(30) Foreign Application Priority Data

Jun. 12, 2001 (DE) .............................. 101 28 396

(51) Int. Cl.
*G06F 1/12* (2006.01)
(52) U.S. Cl. ........................................ 713/400; 710/60
(58) Field of Classification Search ................ 713/400; 710/60
See application file for complete search history.

(56) References Cited

U.S. PATENT DOCUMENTS

| | | | |
|---|---|---|---|
| 4,463,443 A * | 7/1984 | Frankel et al. ............... 710/60 |
| 4,887,261 A | 12/1989 | Roempp | |
| 5,276,688 A | 1/1994 | Urbansky | |
| 5,537,447 A | 7/1996 | Urbansky | |
| 5,633,634 A | 5/1997 | Pawlowski | |
| 5,796,995 A * | 8/1998 | Nasserbakht et al. ....... 713/503 |
| 5,802,122 A | 9/1998 | Niegel | |
| 5,966,417 A * | 10/1999 | McNamara et al. ........ 375/376 |
| 6,009,109 A | 12/1999 | Binder | |

(Continued)

FOREIGN PATENT DOCUMENTS

DE  40 14 815 A1  11/1991

(Continued)

OTHER PUBLICATIONS

Dierks, M., "Logic Event Synchronizer for Data Communications Between Two Logical Functions Having Different Clock Frequencies," IBM Technical Disclosure Bulletin, IBM Corporation, © 1984, New York, vol. 27,NR. 4A, 1911-1914 (4 pages).

*Primary Examiner*—Chun Cao
*Assistant Examiner*—Vincent Tran
(74) *Attorney, Agent, or Firm*—Maginot, Moore & Beck

(57) ABSTRACT

In order to carry out an equidistant data transfer between clock domains having different clock rates, a combination of a counter (1) and a finite state machine (2) is proposed. Said counter (1) continuously counts off the clock cycles of the faster clock (CLK2, while the finite state machine (2) monitors the clock edges of the slower clock (CLK1) and an enabling signal (EN) for the data transfer with the faster clock (CLK2) is produced according to the count of the counter (1).

14 Claims, 3 Drawing Sheets

U.S. PATENT DOCUMENTS

| | | | | |
|---|---|---|---|---|
| 6,033,441 | A | * | 3/2000 | Herbert ....................... 713/375 |
| 6,092,129 | A | * | 7/2000 | Smith et al. ................... 710/60 |
| 6,112,307 | A | * | 8/2000 | Ajanovic et al. ............ 713/400 |
| 6,266,779 | B1 | * | 7/2001 | Kurd ........................... 713/500 |
| 6,330,627 | B1 | * | 12/2001 | Toda ........................... 710/104 |
| 6,836,521 | B2 | * | 12/2004 | Ware et al. .................. 375/354 |
| 7,096,375 | B2 | * | 8/2006 | Wakayama et al. ......... 713/400 |

FOREIGN PATENT DOCUMENTS

| | | |
|---|---|---|
| DE | 43 26 771 A1 | 2/1995 |
| DE | 43 32 761 A1 | 3/1995 |
| DE | 43 39 586 A1 | 5/1995 |
| DE | 195 07 170 A1 | 9/1996 |
| EP | 0 274 647 A1 | 12/1987 |
| EP | 0 461 703 A2 | 6/1991 |

* cited by examiner

| A | B | C | D |
|---|---|---|---|
| 0 | 0 | 3, 0, 1 | 2 |
| 1 | 1 | 0, 1, 2 | 3 |
| 2 | 2 | 1, 2, 3 | 0 |
| 3 | 3 | 2, 3, 0 | 1 |

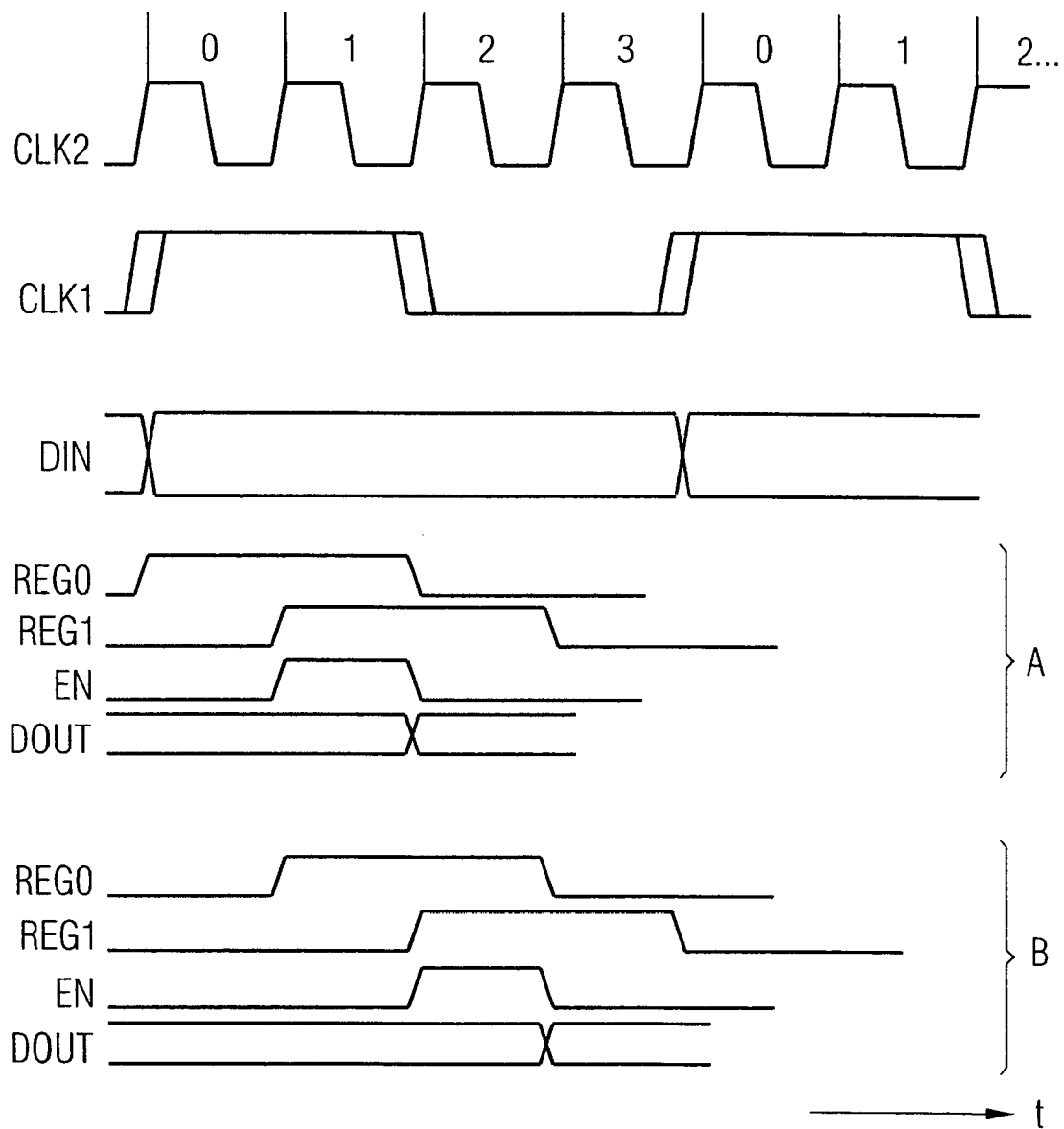

METHOD AND CIRCUIT FOR TRANSMITTING DATA BETWEEN SYSTEMS HAVING DIFFERENT CLOCK SPEEDS

BACKGROUND OF THE INVENTION

The present invention relates to a method as well as a circuit for transmitting data from a system, which is operated by means of a first clock, to a system operated by means of a second clock, whereby the clock rate of the second clock is higher than the clock rate of the first clock.

When data is transmitted between systems, which are operated in different clock domains, in particular when data is transmitted from a system with a relatively low clock rate to a system with a relatively high clock rate, generally the problem arises of synchronizing the data transfer as accurately as possible, so that for example as a result of clock jitter no data is lost or duplicated. Furthermore it is important in particular for hardware filters that the data is transmitted equidistantly, that is to say at regular intervals or in the form of regular data packets, from the lower clock domain to the higher clock domain.

FIG. 3 depicts a synchronizing circuit in accordance with the prior art, which can be used for synchronizing the data transfer from a system operated by means of a relatively low clock rate CLK1 to a system operated by means of a relatively high clock rate CLK2.

As shown in FIG. 3, this synchronizing circuit on the input side comprises a shift register chain, in the present case with two registers 5, 6, whereby in the first register 5 the slower clock CLK1 is fed on the data input. The inverted output of the second register 6 is fed to an AND gate 9, which receives the output signal of the first register 5 as a further input signal. The output of the AND gate 9 is connected to the data input of a further register 8, at the output of which an enabling signal EN for a register 7 is picked up, whereby the data DIN to be transmitted lies on the data input of the register 7. All registers 5-8 are clocked with the faster clock rate CLK2. The logic circuit provided at the output of the shift register chain 5, 6 ensures that a rising clock edge of the slower clock CLK1 can be registered, whereby in this case an enabling pulse EN for the register 7 is produced, so that the data DIN lying on the data input of the register 7 are outputted with the faster clock rate CLK2 in the form of the data DOUT.

FIG. 4 depicts the time progression of the individual signals illustrated in FIG. 3, whereby the output signals REG0 or REG1 of the registers 5 or 6 are also represented in particular. As is evident from FIG. 4, the clock rate of the faster clock CLK2 is four times higher than the clock rate of the slower clock CLK1. In FIG. 4 the clock cycles or clock periods of the clock CLK2, which in each case lie within a clock cycle of the clock CLK1, are numbered with 0. . . 3.

As is equally evident from FIG. 4, the clock edges of the clock CLK1 can vary as a result of clock jitter in such a manner that no clock edge can be accurately recognized with the aid of the synchronizing circuit shown in FIG. 3 in a specific clock cycle of the clock CLK2. Due to the clock jitter of the slower clock CLK1 the rising clock edge of the clock CLK1 can for example be registered in the clock cycle No. 0 or however also only in the clock cycle No. 1 of the clock CLK2. In FIG. 4 the respective progression of the signals REG0, REG1, EN and DOUT consequently ensuing is illustrated for both cases, whereby case A represented in FIG. 4 corresponds to a registration of the rising clock edge of the clock CLK1 in the clock cycle No.0, while case B corresponds to a registration of the rising clock edge of the clock CLK1 in the clock cycle No. 1 of the clock CLK2.

In case A the rising clock edge of the slower clock CLK1 is already registered in the clock cycle No. 0 of the faster clock CLK2, which is evident from the progression of the output signal REG0 of the first register 5 in the shift register chain, so that the enabling signal EN is produced in the clock cycle No. 1. In case B however the enabling signal EN is only produced in the clock cycle No. 2 of the clock CLK2, whereby the data output is retarded accordingly.

The illustration in FIG. 4 demonstrates that sometimes as a result of clock jitter of the slower clock CLK1 the data cannot be transmitted equidistantly, since the enabling signal EN can arise in different clock cycles of the faster clock CLK2.

The object of the present invention is to propose a method as well as a device for transmitting data from a system operated by means of a first clock to a system operated by means of a second clock, whereby the clock rate of the second clock is higher than the clock rate of the first clock, as a result of which data can be transmitted equidistantly, that is to say regularly, even with unknown clock jitter and clock time misalignment.

SUMMARY OF THE INVENTION

This objective is achieved by a method and a circuit of advantageous of embodiments of the present invention.

The method according to the invention proposes that after a start or initialization of the synchronization process, firstly it waits for the next clock edge of the slower first clock. When this next clock edge of the first clock is registered, that clock cycle of the faster second clock, in which this clock edge of the first clock could be registered, is detected in order according to this to determine at least a reliable clock cycle of the second clock, in which the data could be outputted with the second clock. The data to be transmitted are buffered, whereby in each case when such a reliable clock cycle of the second clock arises, the data are read or outputted in accordance with the second clock.

Preferably for example whenever a rising clock edge of the slower first clock is registered, a check is made as to whether this clock edge has arisen or otherwise in the same clock cycle of the second clock as the first mentioned clock edge or in another valid or permissible clock cycle, typically a directly preceding or following clock cycle, of the second clock. If this clock edge of the slower first clock has not arisen in a clock cycle of the faster second clock determined in this way, a new synchronization process is started, that is to say the process is started again from the beginning.

The present invention can be realized by the combination of a counter with in particular a state-regulated control unit, whereby the counter is operated by means of the faster second clock and is designed for counting the individual clock cycles of this second clock. The control unit is equally operated by means of the faster second clock and serves for monitoring the slower first clock, whereby the control unit is connected to the counter output and produces an enabling signal or enabling pulse for a memory device, in which the data to be transmitted are written with the first clock and from which the data are outputted with the second clock, when a corresponding enabling signal of the control unit is present.

The memory device mentioned above in particular can comprise at least a first register, which is operated by means of the slower first clock, for buffering the data to be transmitted, whereby at least a second register, operated by means of the faster second clock, can also be provided, which is coupled with the output of said first register and receives the enabling signal of the control unit, in order thereby to allow data to be transmitted by means of the faster second clock synchronously with the enabling signal of the control unit.

The control unit is preferably constructed in the form of a finite state machine (FSM), while the counter preferably concerns a free running counter (FRC).

The present invention ensures the data is transmitted equidistantly from a system of a slower clock domain to a system of a faster clock domain, irrespective of clock jitter possibly arising (time-variant) or run time difference or time misalignment between the two clock domains, whereby this can be achieved in particular using simple technical circuitry with a very small and robust circuit.

The present invention is described in detail below with reference to the appended drawing on the basis of a preferred embodiment.

BRIEF DESCRIPTION OF THE DRAWINGS

FIG. 4 shows the time progression of various signals illustrated in FIG. 3 to explain the functional mode of the synchronizing circuit represented in FIG. 3.

DESCRIPTION OF PREFERRED EMBODIMENTS

Figure 1:
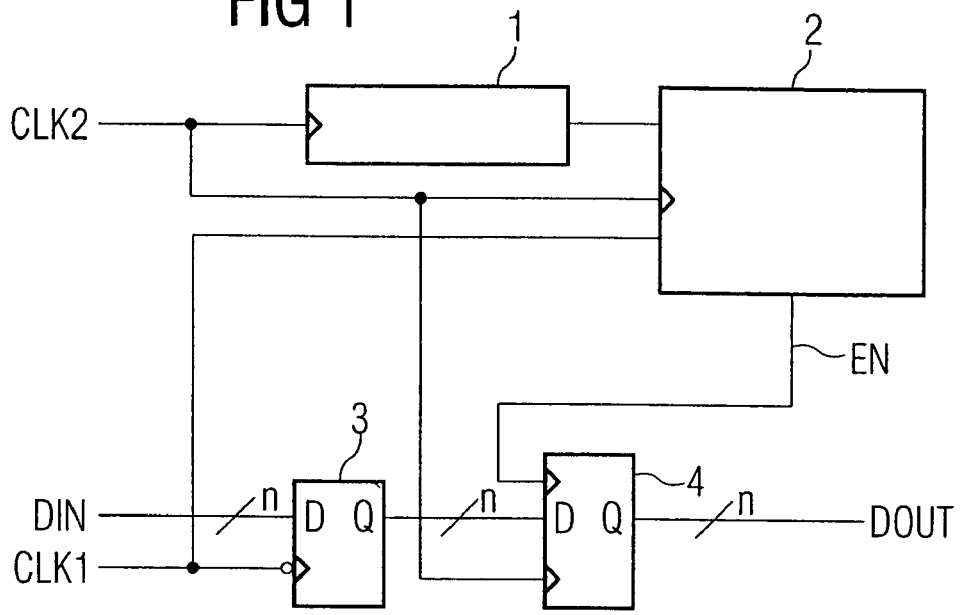
FIG. 1 shows a circuit in accordance with a preferred embodiment of the present invention.

The circuit shown in FIG. 1 can for example be used for synchronizing digital interfaces between systems operated by means of different clocks. In particular this circuit serves for transferring data from a system operated by means of a lower clock to a system operated by means of a faster clock in the form of an equidistant or regular data stream. The clock rate of the faster clock usually corresponds to an integral multiplication of the clock rate of the lower clock.

The circuit shown in FIG. 1 comprises a free running counter 1, which is clocked with the faster clock CLK2. Furthermore the circuit comprises a finite state machine 2, which continuously evaluates the count of counter 1 and is likewise clocked with the faster clock CLK2. At least one register 3 for buffering the data to be transmitted, to which said data DIN are fed, is provided and is clocked inverted with the slower clock CLK1. In the present case it is assumed that n bits are buffered in parallel, so that n such registers 3 are to be provided accordingly. Furthermore n output registers 4 are provided, whereby in each case the data input of an output register 4 is connected to the data output of a corresponding register 3 and the individual output registers 4 are clocked altogether with the faster clock CLK2. The data DOUT to be transmitted are made available with the higher clock rate of the faster clock CLK2 at the output of the individual output registers 4.

Figure 2:
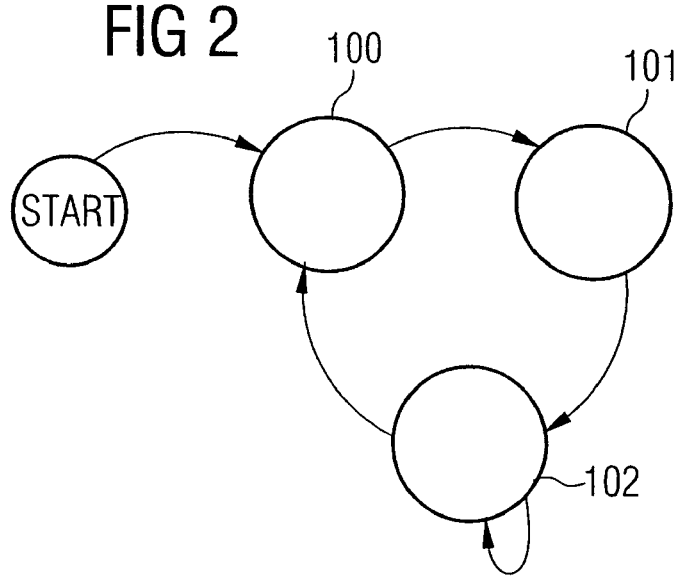
FIG. 2 shows illustrations to explain the functional mode of the circuit represented in FIG. 1.
Figure 3:
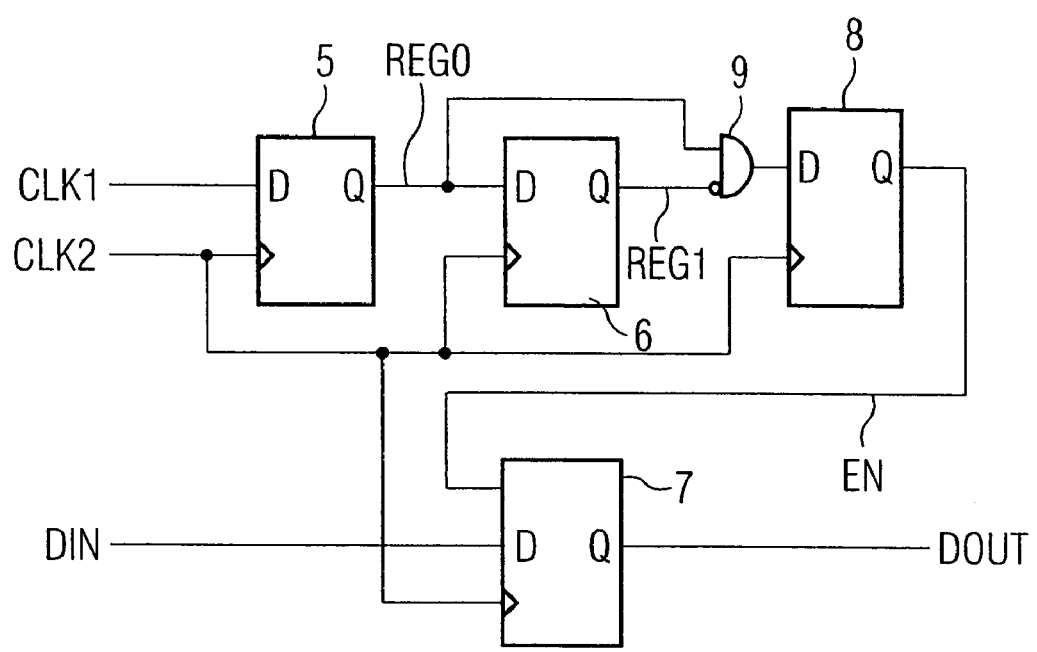
FIG. 3 shows a synchronizing circuit in accordance with the prior art.

The functional mode of the circuit shown in FIG. 2 is as follows.

The counter 1 continuously counts the time cycles of the faster clock CLK2, whereby the count of counter 1 in particular changes periodically in accordance with the relationship between the clock rate of the faster clock CLK2 and the clock rate of the slower clock CLK1, that is to say as shown in FIG. 4 the clock rate of the faster clock CLK2 corresponds to four times the clock rate of the slower clock CLK1, thus counter 1 periodically or cyclically with every clock cycle of the faster clock CLK2 counts from "0" to "3".

Firstly the state 100 shown in FIG. 2 is adopted by the finite state machine 2 after a start or initialization, while the finite state machine 2 waits for the next (in particular rising) clock edge of the slower clock CLK1.

When the first or next rising clock edge of the slower clock CLK1 is detected after the circuit is initialized, the finite state machine 2 changes from the state 100 into a state 101, whereby as a result of the count of the counter 1 being evaluated, that clock cycle of the faster clock CLK2 is determined and stored, while this first rising clock edge of the slower clock CLK1 could be recognized or registered. In addition according to this the number of a "reliable" clock cycle of the faster clock CLK2, in the case of which buffering and output of the data in the faster clock domain by the registers 4 should be possible and deliberate, is determined. The input data DIN are buffered in accordance with the faster clock CLK2, only when this clock cycle of the faster clock CLK2 classified as "reliable" occurs, in the registers 4 and outputted by the latter in the form of the data DOUT. In the first column A of the table shown in FIG. 2 in each case the number of that clock cycle of the faster clock CLK2 is indicated, in which after initialization the first rising clock edge of the slower clock CLK1 could be registered. In the second column B of this table in each case according to this the clock cycle of the clock CLK2 classified as "reliable" is indicated, whereby it is evident from the table shown in FIG. 2 that a clock cycle of the clock CLK2 is always classified as "reliable", whenever its number corresponds to the number of that clock cycle, in which the first rising clock edge of the clock CLK1 could be registered.

After these clock cycles classified as "reliable" are detected or determined the finite state machine 2 changes into a further state 102.

The enabling signal EN for the output registers 4 is always produced by the finite state machine 2 in the state 102, whenever a "reliable" clock cycle of the faster clock CLK2 defined in column B of the table shown in FIG. 2 is present.

Furthermore the slower clock CLK1 is continuously monitored by the finite state machine 2 in the state 102 for its rising clock edges and a check is made as to whether the rising clock edge of the clock CLK1 lies in the same clock cycle of the faster clock CLK2, in which the first rising clock edge has also been registered, or in another clock cycle of the faster clock CLK2 defined as "permissible" or "valid". Usually in this connection the directly adjacent, that is to say preceding or following clock cycles of the clock CLK2 are also regarded as "valid" clock cycles, apart from that clock cycle of the clock CLK2, in which the first rising clock edge of the clock CLK1 could be registered. In this regard for individual cases the respective clock cycles of the faster clock CLK2 classified in this connection as "valid" are represented in column C of the table shown in FIG. 2, while for the corresponding cases the respective clock cycle of the faster clock CLK2 classified as "non-valid" is listed in column D.

Always whenever the finite state machine 2 detects a rising clock edge of the slower clock CLK1 in a clock cycle of the faster clock CLK2 classified as "non-valid", a new synchronization is carried out and the synchronization process described above is re-started and the finite state machine changes into the state 100. As a result of this any run time differences between the two clocks CLK1 and CLK2 cannot accumulate at random. The clock cycle classified as "valid" can thus also be described as synchronization clock cycle.

The invention claimed is:

1. A method for transmitting data from a first system having a first clock to a second system having a second clock, whereby the clock rate of the second clock is higher than the clock rate of the first clock, the method comprising:
   a) detecting a reference clock edge of the first clock;
   b) identifying a clock cycle of the second clock in which the reference clock edge is detected, the identified clock cycle referenced to a first clock cycle period;
   c) outputting subsequent data to be transmitted using the second clock only on subsequent occurrences of the identified clock cycle of the second clock; and
   d) for each subsequent data to be transmitted, determining whether a clock edge of the first clock corresponding to the subsequent data occurs during a set of acceptable clock cycles of the second clock, wherein the set of acceptable clock cycles includes the identified clock cycle and an immediately adjacent clock cycle of the identified clock cycle.

2. The method of claim 1, wherein step c) further comprises
   c1) buffering subsequent data to be transmitted; and
   c2) outputting the buffered data using the second clock only on subsequent occurrences of the identified clock cycle of the second clock.

3. A method for transmitting data from a first system having a first clock to a second system having a second clock whereby the clock rate of the second clock is higher than the clock rate of the first clock, the method comprising:
   a) detecting a reference clock edge of the first clock;
   b) identifying a clock cycle of the second clock in which the reference clock edge is detected, the identified clock cycle referenced to a first clock cycle period;
   c) outputting subsequent data to be transmitted using the second clock only on subsequent occurrences of the identified clock cycle of the second clock; and
   d) for each subsequent data to be transmitted, determining whether a clock edge of the first clock corresponding to the subsequent data occurs during a set of acceptable clock cycles of the second clock, and
   e) returning to step a) if it is determined that the clock edge of the first clock corresponding to the subsequent data occurs out of the set of acceptable clock cycles of the second clock.

4. The method of claim 3 wherein the set of acceptable clock cycles includes the identified clock cycle.

5. The method of claim 3 wherein the set of acceptable clock cycles further includes an immediately adjacent clock cycle of the identified clock cycle.

6. The method of claim 3, wherein step c) further comprises
   c1) buffering subsequent data to be transmitted; and
   c2) outputting the buffered data using the second clock only on subsequent occurrences of the identified clock cycle of the second clock.

7. The method of claim 6, wherein the set of acceptable clock cycles includes the identified clock cycle.

8. The method of claim 7, wherein the set of acceptable clock cycles further includes an immediately adjacent clock cycle of the identified clock cycle.

9. The method of claim 6, wherein the set of acceptable clock cycles further includes an immediately adjacent clock cycle of the identified clock cycle.

10. An arrangement for transmitting data from a first system having a first clock to a second system having a second clock, whereby the clock rate of the second clock is higher than the clock rate of the first clock, the arrangement comprising:
    a counter configured to generate a count value for each clock cycle of the second clock;
    a memory device configured to receive data to be transmitted, the received data clocked by the first clock;
    a control unit operable to
       cause the memory to output the received data on clock cycles of the second clock corresponding to a first counter value,
       identify the counter value corresponding to a clock edge of the first clock associated with the received data, and
       determine whether the counter value corresponds to a predetermined set of counter values, the predetermined set of counter values including the first counter value and one or more counter values adjacent to the first counter value, the one or more adjacent counter values including higher and lower adjacent counter values.

11. The arrangement of claim 10, wherein the control unit further operable to generate cause the memory to output the received data memory only if the control unit determines that the counter value corresponds to a predetermined set of counter values.

12. An arrangement for transmitting data from a first system having a first clock to a second system having a second clock, whereby the clock rate of the second clock is higher than the clock rate of the first clock, the arrangement comprising:
    a counter configured to generate a count value for each clock cycle of the second clock;
    a memory device configured to receive data to be transmitted, the received data clocked by the first clock;
    a control unit operable to
       cause the memory to output the received data on clock cycles of the second clock corresponding to a first counter value,
       identify the counter value corresponding to a clock edge of the first clock associated with the received data,
       determine whether the counter value corresponds to a predetermined set of counter values, wherein the predetermined set of counter values includes the first counter value, and
       cause the memory to output the received data memory only if the control unit determines that the counter value corresponds to a predetermined set of counter values.

13. The arrangement of claim 12, wherein the predetermined set of counter values includes one or more counter values adjacent to the first counter value.

14. The arrangement of claim 13, wherein the one or more adjacent counter values includes higher and lower adjacent counter values.

* * * * *